United States Patent
Maruyama et al.

(10) Patent No.: US 6,483,561 B2
(45) Date of Patent: Nov. 19, 2002

(54) WIDE VIEWING ANGLE LIQUID CRYSTAL DISPLAY HAVING BOTH OPTICAL COMPENSATOR AND OPTICAL DIFFUSER

(75) Inventors: Muneo Maruyama, Tokyo (JP); Susumu Ohi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/059,197

(22) Filed: Jan. 31, 2002

(65) Prior Publication Data

US 2002/0093612 A1 Jul. 18, 2002

Related U.S. Application Data

(62) Division of application No. 08/883,576, filed on Jun. 26, 1997.

(30) Foreign Application Priority Data

Jun. 27, 1996 (JP) .............................. 8-167388

(51) Int. Cl.$^7$ ............................ G02F 1/1335
(52) U.S. Cl. ................... 349/112; 349/117; 349/120
(58) Field of Search ................. 349/112, 117, 349/118, 119, 120, 102

(56) References Cited

U.S. PATENT DOCUMENTS

| | | | |
|---|---|---|---|
| 3,912,369 A | | 10/1975 | Kashnow |
| 4,088,400 A | * | 5/1978 | Assouline et al. .......... 349/112 |
| 5,557,433 A | | 9/1996 | Maruyama et al. |
| 5,600,456 A | | 2/1997 | Maruyama et al. |
| 5,721,600 A | * | 2/1998 | Sumiyoshi et al. ......... 349/119 |
| 5,734,455 A | | 3/1998 | Yoshida et al. |
| 5,777,709 A | | 7/1998 | Xu |
| 5,805,253 A | * | 9/1998 | Mori et al. ................. 349/118 |
| 5,808,709 A | * | 9/1998 | Davis et al. ................ 349/65 |
| 6,075,581 A | * | 6/2000 | Shirochi .................... 349/112 |

FOREIGN PATENT DOCUMENTS

| | | |
|---|---|---|
| JP | 48-43292 | 6/1973 |
| JP | 64-25123 | 1/1989 |
| JP | 5-134252 | 5/1993 |
| JP | 5-196927 | 8/1993 |
| JP | 5-196939 | 8/1993 |
| JP | 5-216031 | 8/1993 |
| JP | 5-313156 | 11/1993 |
| JP | 5-313159 | 11/1993 |
| JP | 6-82776 | 3/1994 |
| JP | 7-72470 | 3/1995 |
| JP | 7-104271 | 4/1995 |
| JP | 7-104272 | 4/1995 |
| JP | 7-120619 | 5/1995 |
| JP | 7-120743 | 5/1995 |
| JP | 7-159614 | 6/1995 |
| JP | 2809089 | 9/1995 |
| JP | 2679642 | 3/1996 |
| JP | 9-43597 | 2/1997 |
| JP | 9-90335 | 4/1997 |
| JP | 9-189811 | 7/1997 |
| JP | 9-211442 | 8/1997 |
| JP | 9-288270 | 11/1997 |

OTHER PUBLICATIONS

Ohgawara et al., "A Color STN Display with Two Retardation Compensating Films," *SID* 89 Digest, pp 390–393 (May 1989).

"Wide–Viewing–Angle TN–LCD with Optical Compensators." H. Mori, pp. 298–299.

\* cited by examiner

*Primary Examiner*—William L. Sikes
*Assistant Examiner*—Tai Van Duong
(74) *Attorney, Agent, or Firm*—Sughrue Mion, PLLC (57) ABSTRACT

A liquid crystal display unit produces image carrying light through a liquid crystal layer having a positive anisotropy of refractive index; an optically compensating layer with a negative anisotropy of refractive index is provided on an optical path of the image carrying light so as to compensate the optical anisotropy of the liquid crystal, and the image carrying light is incident onto an optically diffusing layer after the optical compensation so as to widen the viewing angle of the liquid crystal display unit without deterioration of image contrast.

2 Claims, 12 Drawing Sheets

WIDE VIEWING ANGLE LIQUID CRYSTAL DISPLAY HAVING BOTH OPTICAL COMPENSATOR AND OPTICAL DIFFUSER

This is a divisional of application No. 08/883,576 filed Jun. 26, 1997, continued on May 8, 2000; the disclosure of which is incorporated herein by reference.

FIELD OF THE INVENTION

This invention relates to a liquid crystal display unit and, more particularly, to a wide viewing angle liquid crystal display having an optical compensator and an optical diffuser.

DESCRIPTION OF THE RELATED ART

The liquid crystal display has various attractive features such as light, thin and low in power consumption, and find a wide variety of application. A flat display panel is a typical consumer product of the liquid crystal display, and forms an essential part of an office machine, portable television set for vehicles or a navigation system for vehicles.

The liquid crystal display used in the vehicles is expected to have a wide viewing angle, because the liquid crystal display is usually placed to be close to the driver. An image produced on the liquid crystal display has a viewing angle dependency. The image is assumed to be recognized as a black configuration by a person sitting in front of the liquid crystal display. However, when the person is laterally moved over a critical angle, the image whitens, and the person feels it unclear. For this reason, the liquid crystal display for vehicles is expected to have the wide viewing angle characteristics.

Figure 1:
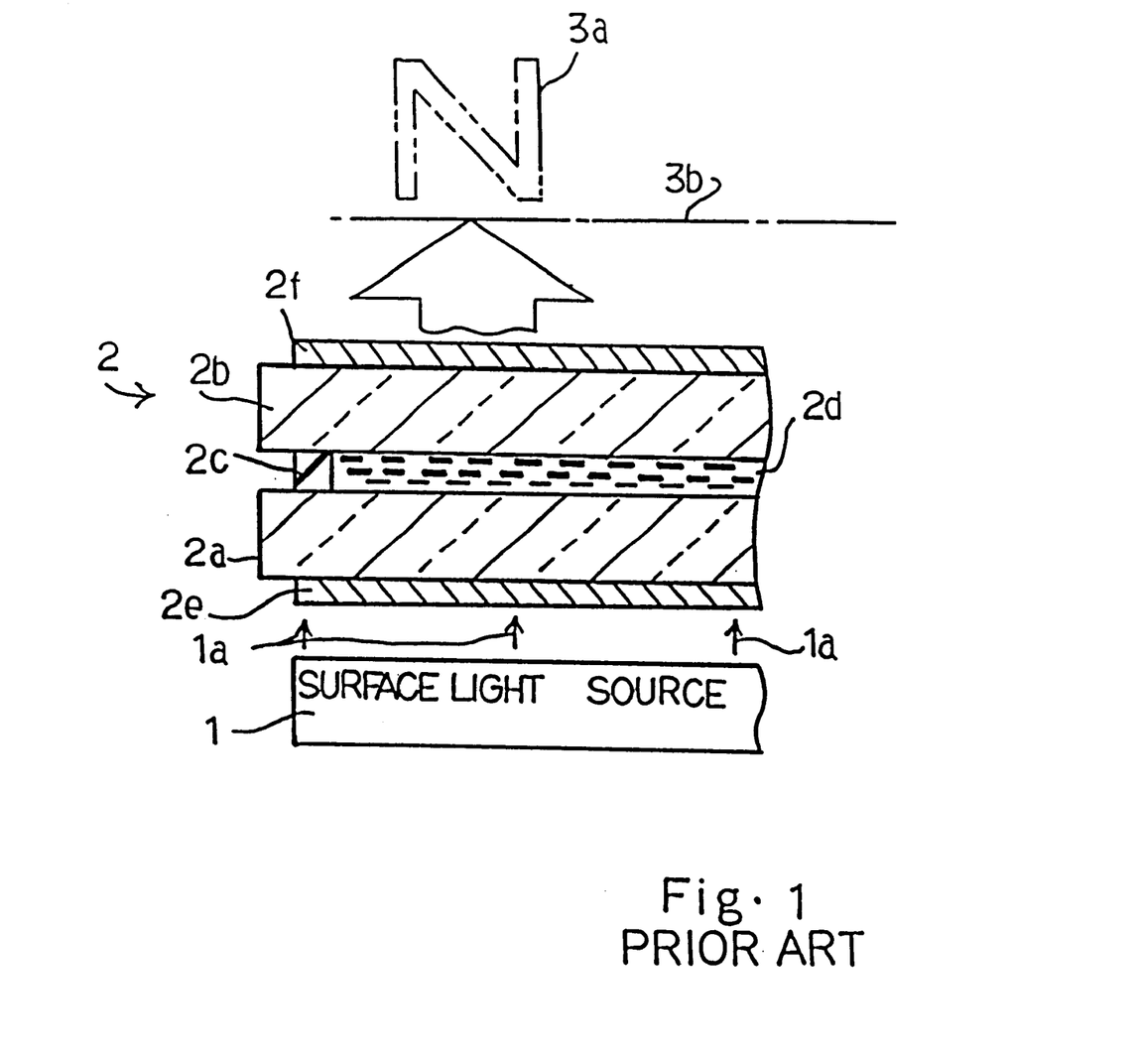
FIG. 1 is a cross sectional view showing the structure of the prior art standard liquid crystal panel.

FIG. 1 illustrates a standard liquid crystal display. The prior art liquid crystal display largely comprises a surface light source 1 and a liquid crystal panel 2. The surface light source 1 is implemented by a cold-cathode tube fluorescent lamp associated with an optical guide plate, and illuminates the liquid crystal panel 2. The cold-cathode tube fluorescent lamp is assumed to be a line light source, and the light is incident into an input end surface of the optical guide plate. The light repeats the total reflection in the optical guide plate, and diffusing elements in the optical guide plate cause the light la to uniformly illuminate the liquid crystal panel 2. If the light 1a is less uniform, a diffusing sheet is further attached to the output end surface of the optical guide plate.

The liquid crystal panel 2 includes a pair of transparent substrate structures 2a and 2b spaced apart from each other by a sealing layer 2c and twisted nematic liquid crystal 2d filling the gap between the transparent substrate structures 2a and 2b. The twisted nematic liquid crystal 2d has a twisting angle of about 90 degrees.

The transparent substrate structure 2a has a plurality of pixel electrodes arranged in matrix, a plurality of thin film transistors selectively connected between the pixel electrodes and image signal lines and gate control lines selectively connected to the gate electrodes of the thin film transistors, and these components are formed on and over a transparent glass substrate. On the other hand, the transparent substrate structure 2b has a transparent counter electrode and color filters formed on and over a transparent glass substrate.

The liquid crystal panel 2 further includes polarizing plates 2e/2f attached to the outer surfaces of the transparent substrate structures 2a/2b, respectively. When the standard liquid crystal display is designed to be normally white mode, the polarizing plates 2e/2f have transmission axes angularly spaced at 90 degrees. The pixel electrodes, the twisted nematic liquid crystal and the counter electrode form a matrix of liquid crystal capacitors, and the liquid crystal capacitors serve as a matrix of pixels where an image is produced When an image 3a is produced on a screen 3b, the counter electrode is biased to a certain constant potential level, and image-carrying signals sequentially bias the pixel electrodes to potential levels representing the gradations by controlling the thin film transistors. The droplets of liquid crystal droplet 2d rise at different angles depending upon the potential difference between the pixel electrodes and the counter electrode, and the pixels have a certain dispersion of transmittance so as to produce the image 3a on the screen 3b.

When a person sees the image 3a in front of the screen 3b, the person clearly recognizes the image 3a on the screen 3b. However, the liquid crystal 2d has an anisotropic refractive index. If the image is obliquely seen, an inversion of gradation or deterioration of contrast ratio take place, and the person hardly discriminates the image 3a on the screen 3b. The inversion of gradation is the phenomenon where an image recognized by a person is produced in a gradation inverted from a gradation of an image intended to be produced on the screen. The contrast ratio is a ratio between white luminance and black luminance. In general, when the person is downwardly moved to a position at 5 degrees with respect to a vertical line to the screen 3b, the inversion of gradation takes place. If the angle exceeds 30 degrees toward an upper portion of the screen and 50 degrees toward a lower position of the screen, the contrast ratio is decreased to 10 or less.

Figure 2:
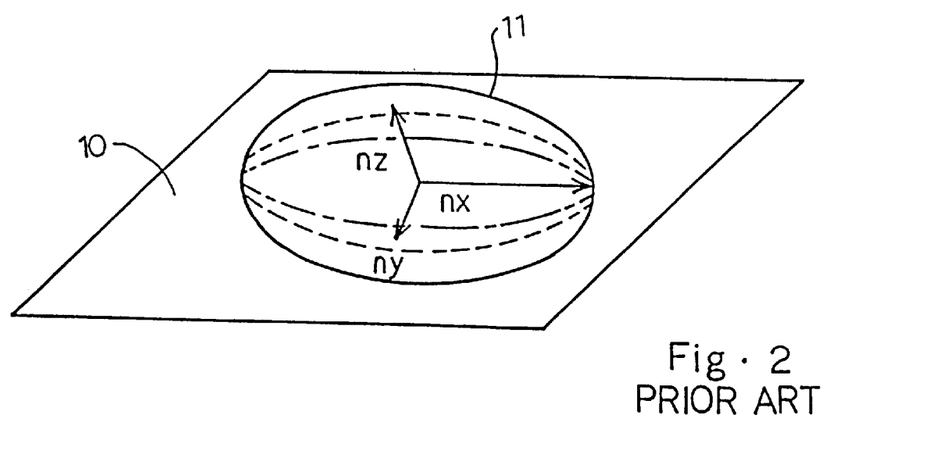
FIG. 2 is a perspective view showing the index ellipsoid of the optically anisotropic element used in the first prior art liquid crystal display panel.
Figure 3:
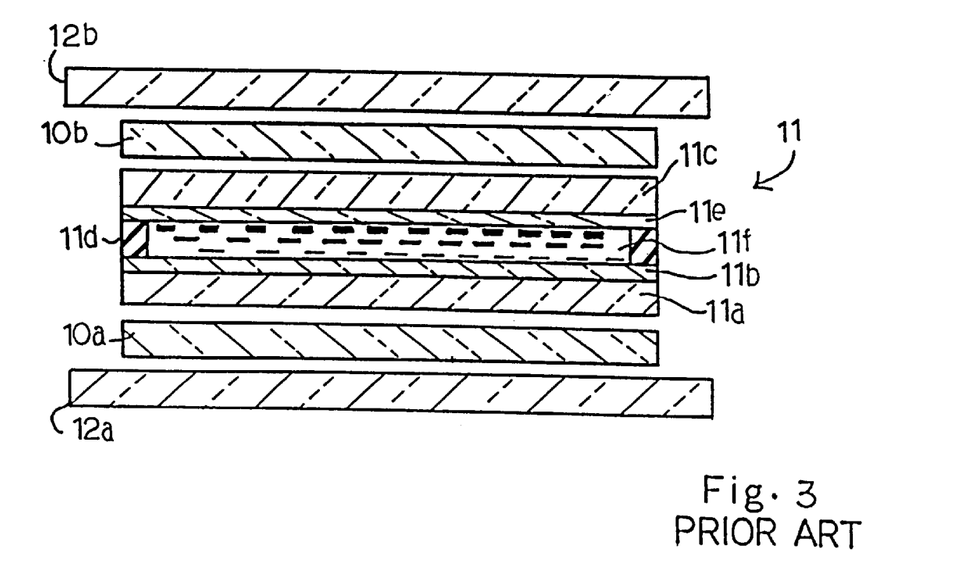
FIG. 3 is a cross sectional view showing the structure of the first prior art liquid crystal display panel.

Thus, the anisotropy of the refractive index makes the viewing angle of the liquid crystal display narrow, and various technologies have been proposed for wide viewing angle characteristics. One of the techniques is disclosed in Japanese Patent Publication of Unexamined Application No. 7-120619, and FIGS. 2 and 3 illustrates an index ellipsoid of an optically anisotropic element and a liquid crystal panel using the optically anisotropic film both disclosed in the Japanese Patent Publication of Unexamined Application. The liquid crystal panel shown in FIGS. 2 and 3 is hereinbelow referred to as "first prior art".

The optically anisotropic film 10 has the principal indices of refraction nx, ny and nz where nx>ny>nz. As shown in FIG. 2, nx is on the optically anisotropic film 10, and ny and nz decline with respect to a rotating axis aligned with the direction of nx. The principal indices of refraction are represented by an index ellipsoid. The optically anisotropic film 10 is effective against reduction of contrast due to a double refraction inherent in liquid crystal.

Using a pair of optically anisotropic films 10a/10b, the first prior art liquid crystal panel comprises a liquid crystal cell 11 provided between the optically anisotropic films 10a/10b and polarizing layers 12b/12b, and the polarizing layers 12a/12b are spaced from each other by a gap where the liquid crystal cell 11 and the optically anisotropic films 10a/10b are inserted. The liquid crystal cell 11 is analogous to the prior art standard liquid crystal panel, and includes a bottom transparent substrate 11a, transparent electrodes 11b formed on the bottom transparent substrate 11a, a top transparent substrate 11c spaced from the bottom transparent substrate 11a by a spacer 11d, a transparent electrode 11e formed on the lower surface of the top transparent substrate 11c and liquid crystal 11f filling the gap between the bottom transparent substrate 11a and the top transparent substrate 11c.

Although the optically anisotropic films 10a/10b suppress the reduction of contrast due to the double refraction of the liquid crystal, the optically anisotropic films 10a/10b can not sufficiently suppress the inversion of gradation. When twisted nematic liquid crystal is used for the first prior art, an image is unintentionally colored.

Figure 4:
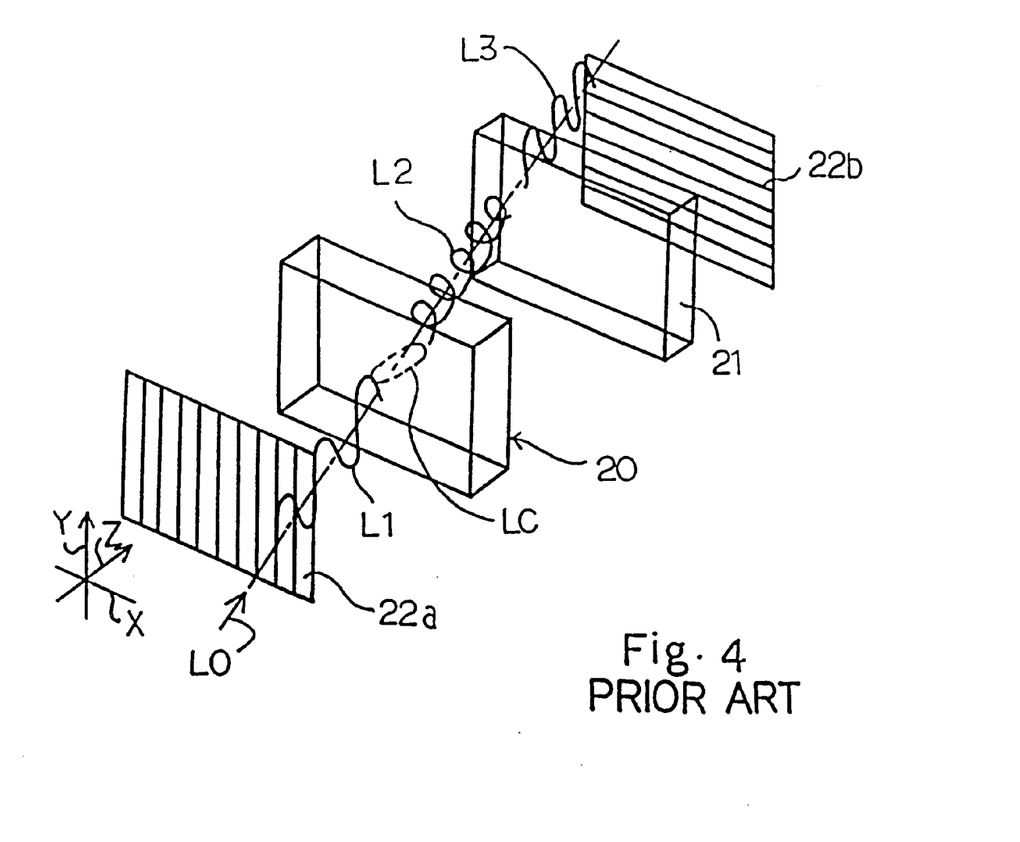
FIG. 4 is a perspective view showing the polarization of the light incident onto the second prior art liquid crystal display panel.

Another improvement is disclosed in Japanese Patent Publication of Unexamined Application No. 7-159614, and is hereinbelow referred to as "second prior art". FIG. 4 illustrates a polarization of light L0 obliquely incident onto the second prior art. The second prior art comprises a liquid crystal cell 20, an optically anisotropic element 21 and a pair of polarizing plates 22a/22b, and liquid crystal LC fills a gap in the liquid crystal cell 20.

When the light is obliquely incident onto the polarizing plate 22a, lineally polarized light Li takes place, and proceeds toward the liquid crystal cell 20. The liquid crystal LC converts the linearly polarized light Li to elliptically polarized light L2 due to the an isotropy of refractive index of the liquid crystal LC.

If the elliptically polarized light L2 directly proceeds to the polarizing plate 22b, the polarizing plate 22b can not appropriately block the elliptically polarized light L2, and leakage takes place. However, the optically anisotropic element 21 is provided between the liquid crystal cell 20 and the polarizing plate 22b. The optically anisotropic element 21 introduces a retardation, and converts the elliptically polarized light L2 to linearly polarized light L3. Even if the light is obliquely incident onto the second prior art, the second prior art provides a transmittance to the obliquely incident light equal to that of light normally incident thereto. Thus, the optically anisotropic element 21 eliminates the viewing angle dependency from the second prior art.

The optically anisotropic element 21 is formed of optically negative uniaxial crystal. When the refraction indices in the major three axes are called as n-alpha, n-beta and n-gamma in the order of magnitude, i.e., from the smallest value toward the largest value, the refraction indices have the following relation, n-alpha<n-beta<n-gamma. Thus, the optically anisotropic element 21 has the smallest refractive index in the direction of optical axis. The optical axis is not on the incident surface of the optically anisotropic element, nor is matched with the normal line to the incident surface. However, the second prior art can not sufficiently suppress the inversion of gradation.

Figure 5:
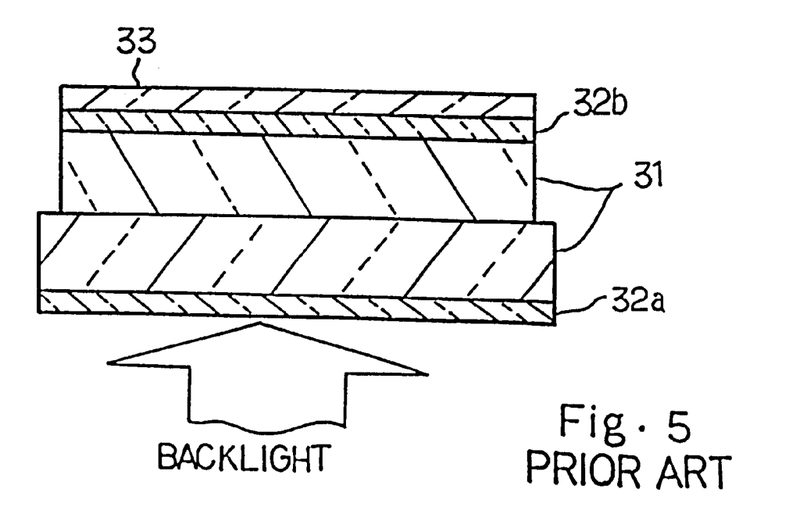
FIG. 5 is a cross sectional view showing the structure of the third prior art liquid crystal display panel.

Yet another improvement is disclosed in Japanese Patent Publication of Unexamined Application No. 6-82776, and FIG. 5 illustrates the prior art liquid crystal display panel disclosed in the Japanese Patent Publication of Unexamined Application. The prior art liquid crystal display panel is hereinbelow referred to as "third prior art".

The third prior art comprises a liquid crystal display panel 31 sandwiched between polarizing plates 32a and 32b, and an optical diffusion plate 33 is attached to the polarizing plate 32b. A light source (not shown) is provided at the back of the polarizing plate 32a, and illuminates the liquid crystal display panel 31 through the polarizing plate 32a. The light is incident onto the liquid crystal display panel 31, and carries an image from the liquid crystal display panel 31 through the polarizing plate 32b to the optical diffusion plate 33. The optical diffusion plate 33 diffuses the image carrying light, and averages the contrast ratio over the image forming screen. As a result, the contrast ratio is improved at a large viewing angle.

The optical diffusion plate 33 is formed of acrylic resin or polyvinylalcohol containing white pigment or having rough surface. However, the optical diffusion plate 33 lowers the contrast to a person who sees an image from the vertical direction to the image forming screen, because the light obliquely leaked through a black image is reflected toward the front direction. Moreover, the optical diffusion plate 33 whitens the image due to the irregular reflection.

As will be understood from the foregoing description, the prior art standard liquid crystal display panel and the first to third prior art liquid crystal display panels encounter the following problems.

The prior art standard liquid crystal display panel is narrow in viewing angle, and the gradation is destroyed due to the difference in retardation, i.e., the product of the difference delta-n between the refractive index ne for an extraordinary ray and the refractive index n0 for an ordinary ray and the liquid crystal gap d. When the viewing point is widely deviated from the normal line to the image forming screen, the destruction of the gradation becomes more serious.

The first and second prior art liquid crystal display panels can suppress the reduction in contrast ratio by virtue of the optically anisotropic elements. However, the inversion of gradation still takes place, and images are unintentionally colored when the twisted nematic liquid crystal is used.

The third prior art liquid crystal display panel lowers the contrast at the vertical position to the image forming screen due to the averaging of the contrast over the image forming screen, and whitens the image due to the irregular reflection. Moreover, the optical diffusion plate reflects the light from the outside thereof, and makes the visibility poor.

SUMMARY OF THE INVENTION

It is therefore an important object of the present invention to provide a liquid crystal display panel which improves the viewing angle and is prevented from the inversion of gradation, the unintentionally colored image and poor visibility.

To accomplish the object, the present invention proposes to compensate the anisotropy of refractive index of liquid crystal and diffuse image carrying light after the optical compensation.

In accordance with the present invention, there is provided a liquid crystal display unit comprising: a light source generating first light proceeding along an optical path; polarizing layers provided on the optical path, and spaced from each other; a liquid crystal panel provided between the polarizing layers, and including a liquid crystal layer for producing second light carrying an image from the first light and having a first anisotropic index of ellipsoid with respect to one of a normal line to an incident surface of the liquid crystal panel and an oblique line declining from the normal line; an optically anisotropic layer provided on the optical path, and having a second anisotropic index of ellipsoid converse to the first anisotropic index of ellipsoid with respect to the aforesaid one of the normal line and the oblique line; and an optically diffusing layer provided on the optical path for averaging the intensity of the second light passing through the optically anisotropic layer.

The liquid crystal display unit may further comprise a condenser layer.

BRIEF DESCRIPTION OF THE DRAWINGS

The features and advantages of the liquid crystal display panel according to the present invention will be more clearly understood from the following description taken in conjunction with the accompanying drawings in which.

DESCRIPTION OF THE PREFERRED EMBODIMENTS

First Embodiment

Figure 6:
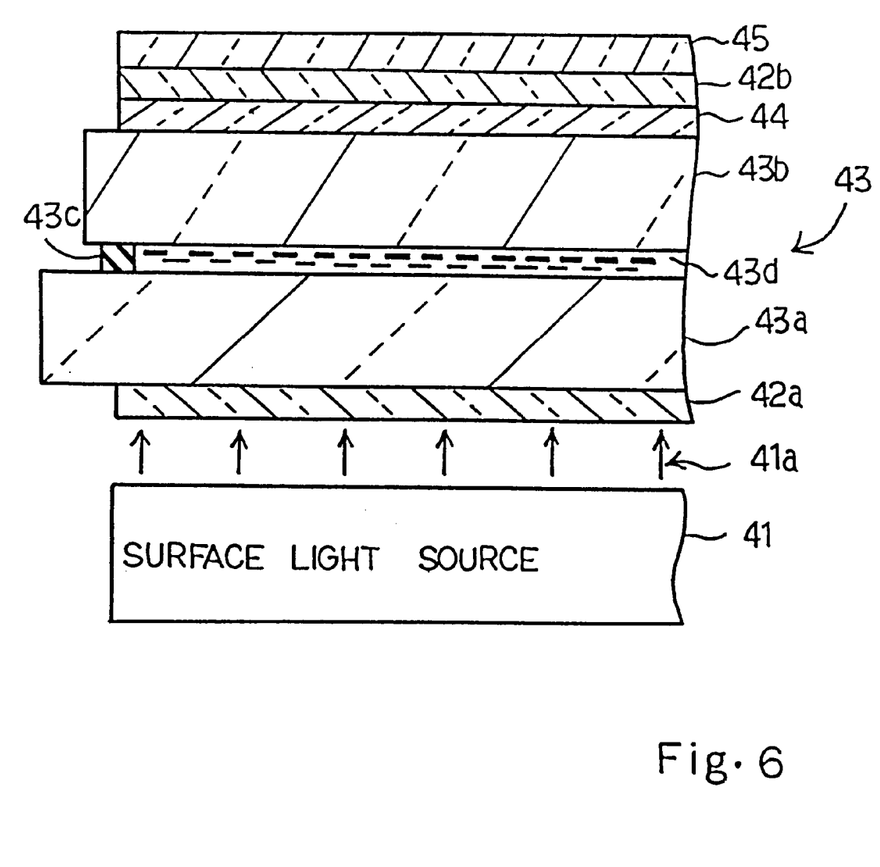
FIG. 6 is a cross sectional view showing the structure of a liquid crystal display unit according to the present invention.

Referring to FIG. 6 of the drawings, a liquid crystal display unit embodying the present invention largely comprises a surface light source 41, a pair of polarizing layers 42a/42b spaced from each other, a liquid crystal panel 43 provided between the polarizing layers 42a and 42b, an optically compensating film 44 inserted between the liquid crystal panel 43 and the polarizing layer 42b and an optically diffusing layer 45 attached to the polarizing layer 42b.

Although only a part of the liquid crystal display unit is shown in FIG. 6, a person skilled in the art can image the entire structure of the liquid crystal display unit implementing the embodiment.

The surface light source 41 includes a cold cathode tube type fluorescent lamp and an optical guide plate. The cold cathode tube type fluorescent lamp radiates light toward incident onto an end surface of the optical guide plate, and the light repeats the total reflection in the optical guide plate. The optical guide plate contains diffusion elements, and the diffusion elements spread the light. Thus, the optical guide plate causes the light 1a to uniformly illuminate the liquid crystal panel 43 through the polarizing layer 42a.

The liquid crystal panel 43 includes an active matrix substrate structure 43a, a color filter substrate structure 43b spaced from the active matrix substrate structure 43a, a sealing layer 43c sandwiched between the active matrix substrate structure 43a and the color filter substrate structure 43b along the periphery thereof. Twisted nematic liquid crystal 43d fills the gap between the active matrix substrate structure 43a and the color filter substrate structure 43b, and the twisting angle is about 90 degrees.

The active matrix substrate structure 43a is fabricated on a transparent substrate, and transparent pixel electrodes are arranged in matrix on the transparent substrate. Thin film transistors, image signal lines and gate control lines are further fabricated on and over the transparent substrate. The thin film transistors are connected between the associated transparent pixel electrodes and the image signal lines, and are gated by the gate control lines so as to supply image carrying signals to the associated transparent pixel electrodes.

The color filter substrate structure 43b is also fabricated on a transparent substrate, and a transparent counter electrode and color filters for the three primary colors are formed on and over the transparent substrate. The transparent counter electrode is opposed through the twisted nematic liquid crystal to the transparent pixel electrodes. The transparent pixel electrodes, the transparent counter electrode and the twisted nematic liquid crystal form a plurality of liquid crystal capacitors serving as a matrix of pixels, and the image carrying signals individually change the transmittance of the pixels so as to produce an image.

The optically compensating layer 44 is formed of optical material having negative optical characteristics, and has an optical axis either aligned with the normal line to the incident surface thereof or declining from the normal line. When the surface light source 41 radiates light 41a through the polarizing layer 42a to the liquid crystal panel 43, obliquely incident light destroys the gradation and brightens a black image due to the double refraction of the twisted nematic liquid crystal 43d. The destruction of the gradation and the bright black image become more serious together with the incident angle of the oblique light with respect to the normal line. The optically compensating layer 44 aims at suppression of the bright black image.

The liquid crystal display unit is operative in a normally white mode, and the polarizing layers 42a and 42b have transmission axes deviated at 90 degrees from each other. The liquid crystal panel 43 and the optically compensating layer 44 are sandwiched between the polarizing layers 42a and 42b. The optically diffusing layer 45 is attached to the opposite surface to the optically compensating layer 44.

Figure 7A:
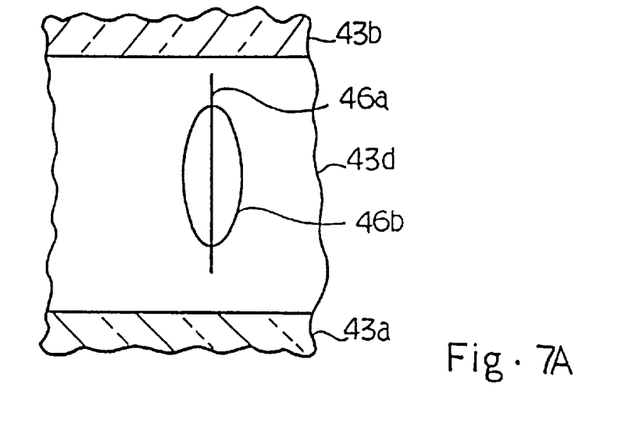
FIGS. 7A to 7C are views showing the index ellipsoid of twisted nematic liquid crystal incorporated in the liquid crystal display unit.
Figure 7B:
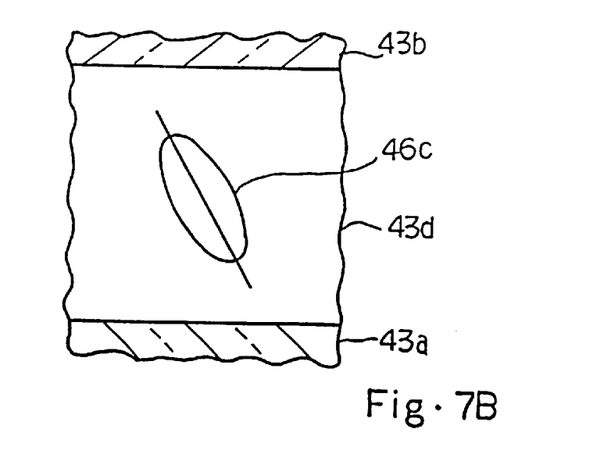
Figure 7C:
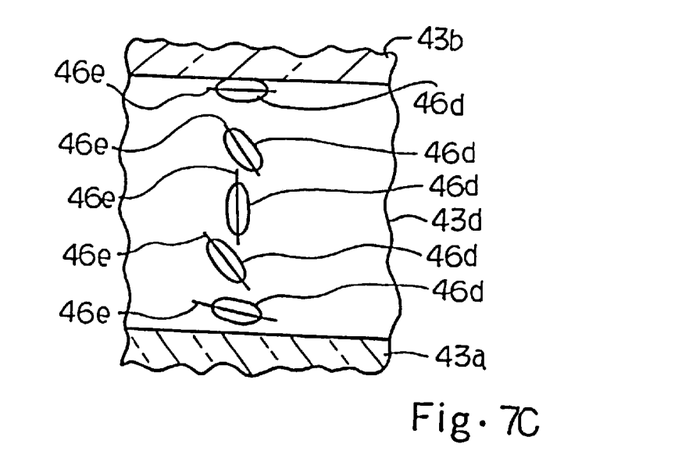

The liquid crystal display unit behaves as follows. The twisted nematic liquid crystal 43d is positively uniaxial. When the liquid crystal display unit produces a black image, the index ellipsoid of the twisted nematic liquid crystal 43d is elongated in the direction of the optical axis as shown in FIGS. 7A to 7C. Assuming now that all the twisted nematic liquid crystal droplets rise in the direction of the electric field created thereacross, the optical axis 46a is matched with the normal line to the substrate structures 43a/43b, and the index ellipsoid 46b is elongated in the direction of the optical axis 46a aligned with the normal line as shown in FIG. 7A.

However, the twisted nematic liquid crystal droplets in the vicinity of the substrate structures 43a/43b have optical axes declining at certain angles with respect to the normal line due to the rubbing of orientation layers (not shown) covering the inner surfaces of the substrate structures 43a/43b, and the average index ellipsoid 46c declines from the normal line as shown in FIG. 7B. In the actual twisted nematic liquid crystal layer 43d, the liquid crystal droplets successively change the optical axes between the substrate structures 43a/43b, and, accordingly, the index ellipsoid 46d changes the angle between the substrate structures 43a and 43b as shown in FIG. 7C. Although the twisted nematic liquid crystal droplets at the intermediate portion have the optical axes 46e aligned with the normal line, the twisted nematic liquid crystal droplets decline from the normal line in the vicinity of the substrate structures 43a/43b.

Figure 8A:
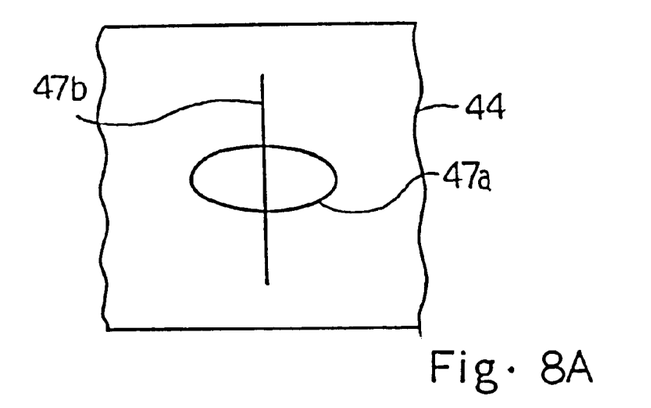
FIGS. 8A to 8C are views showing the index ellipsoid of an optical compensating layer incorporated in the liquid crystal display unit.
Figure 8B:
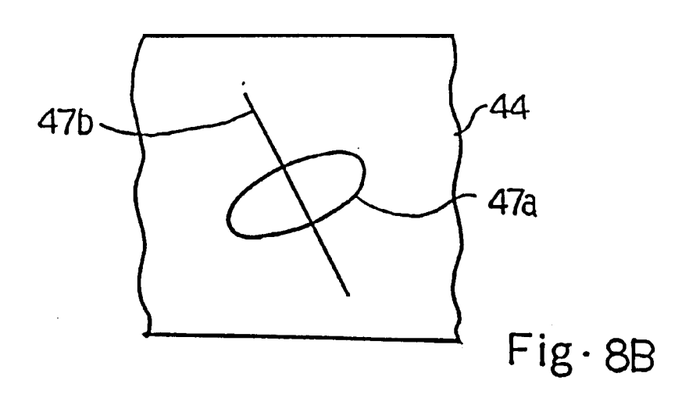
Figure 8C:
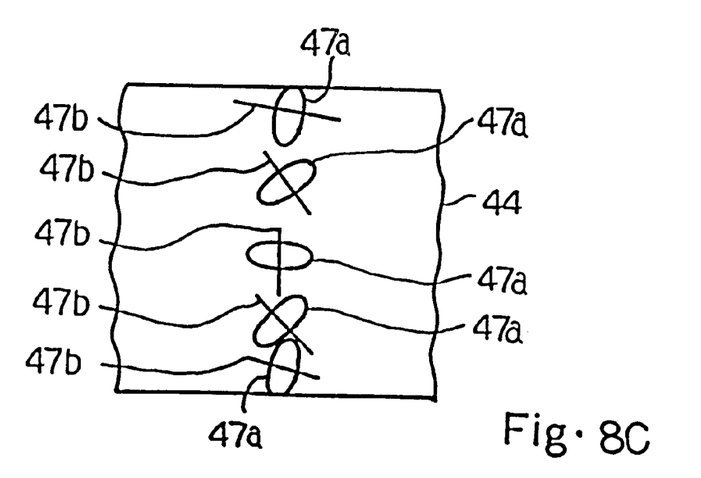

The optically compensating layer 44 is formed of the optical material negatively uniaxial, and, for this reason, compensates the optical properties of the twisted nematic liquid crystal 43b as shown in FIGS. 8A to 8C. The index ellipsoid 47a is elongated in the direction perpendicular to the optical axis 47b.

A first example of the optically compensating layer 44 has an index ellipsoid 47a shown in FIG. 8A, and the index ellipsoid 47a shown in FIG. 8A is corresponding to that of the twisted nematic liquid crystal droplets oriented in the direction of the electric field shown in FIG. 7A. The optical axis 47b is aligned with the normal line to the incident surface of the optically compensating layer 44.

A second example of the optically compensating layer 44 is shown in FIG. 8B. The index ellipsoid 47a shown in FIG. 8B is corresponding to that of the twisted nematic liquid crystal droplets declining from the normal line at the certain angle shown in FIG. 7B, and the optical axis 47b declines from the normal line.

FIG. 8C illustrates the index ellipsoid of a third example of the optically compensating layer 44. The index ellipsoid shown in FIG. 8C is corresponding to that shown in FIG. 7C. The third example has a multi-layered structure, and the optical axis 47b is gradually changed in a similar manner to the optical axis 46e.

Although the first to third examples of the optically compensating layer are effective against the bright black image, the third example is the most desirable, the second example follows the third example, and the first example achieves the least effect.

A typical example of the negatively uniaxial optical anisotropic material is discotic liquid crystal. When the second example or the third example is employed in the liquid crystal display unit, it is desirable to regulate the optical axis 46e to ±10 degrees in the surface portion of the optically compensating layer 44 held in contact with the color filter substrate structure 43b because of the direction of the rubbing of the orientation layer.

The optically compensating layer 44 available for the liquid crystal display unit is disclosed in "Wide-Viewing-Angle TN-LCD with Optical Compensators", the proceedings of 21st liquid crystal forum, pages 298 and 299. The optically compensator has a supporting substrate coated with the discotic liquid crystal. Any optical compensator formed of optically anisotropic material is available for the liquid crystal display unit in so far as the optically anisotropic material has a negative anisotropy of refractive index with respect to the normal line or an oblique line declining from the normal line, and achieves a wide viewing angle. Even if the material is optically biaxial, the optical compensator is effective.

As will be understood from the foregoing description, the optically compensating layer 44 effectively suppresses the bright black image, and enhances the contrast of an image seen from a position angularly spaced from the normal line.

The image carrying light is radiated from the optically compensating layer 44, and is incident through the polarizing layer 42b onto the optically diffusing layer 45. The optically diffusing layer 45 diffuses a large amount of light in the direction parallel to the normal line so as to average the quantity of light.

Figure 12:
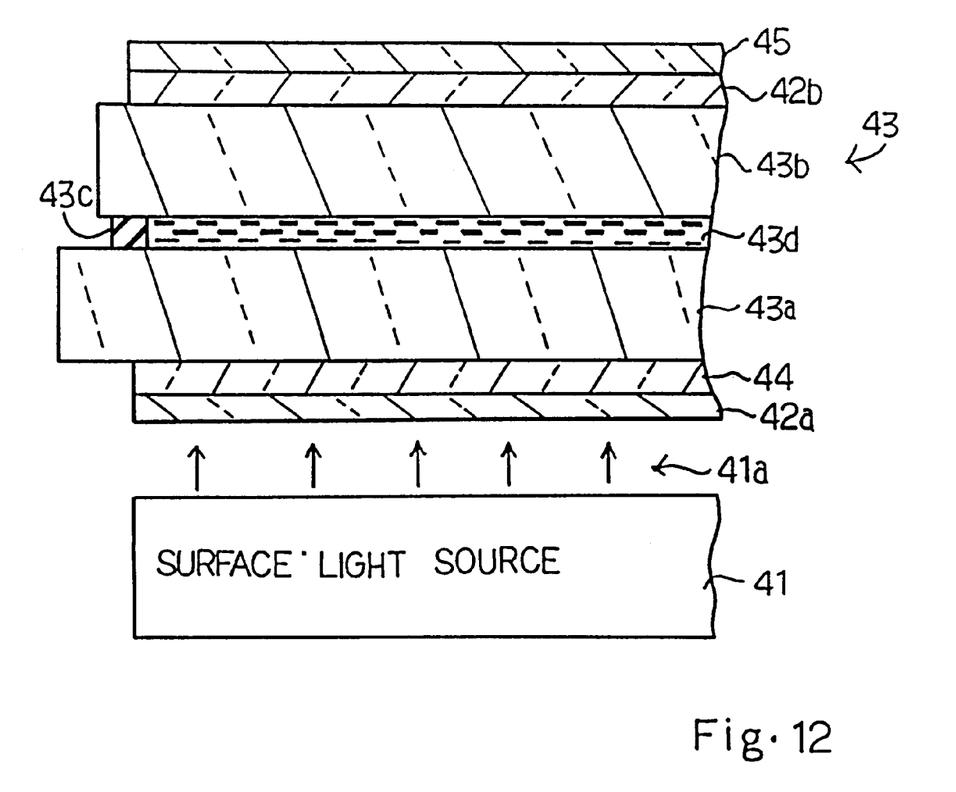
FIG. 12 is a cross sectional view showing the structure of a modification of the liquid crystal display unit according to the present invention.

The optically compensating layer 44 may be inserted between the polarizing layer 42a and the active matrix substrate layer 43a as shown in FIG. 12.

Figure 9:
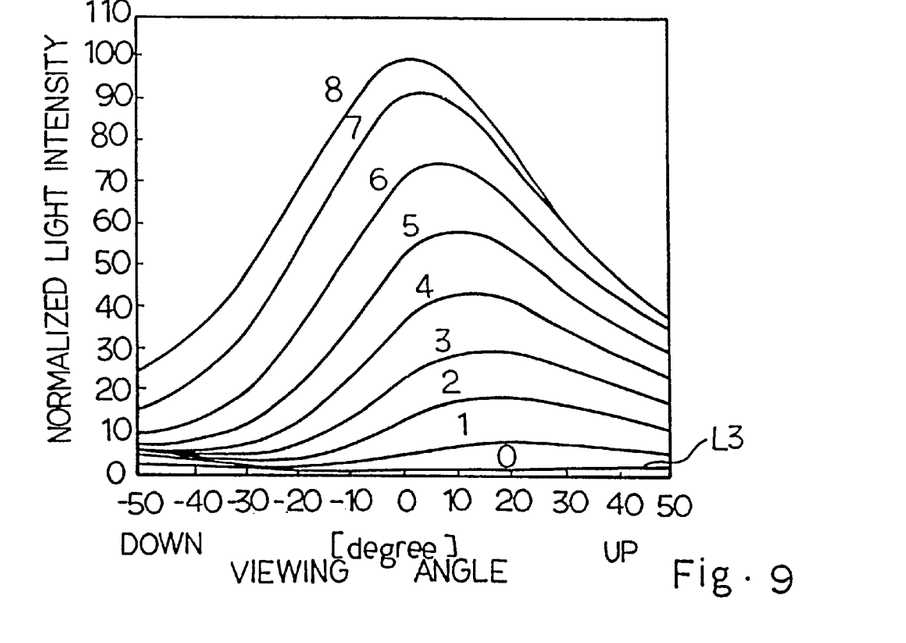
FIG. 9 is a graph showing the gradation achieved by the liquid crystal display unit.
Figure 10:
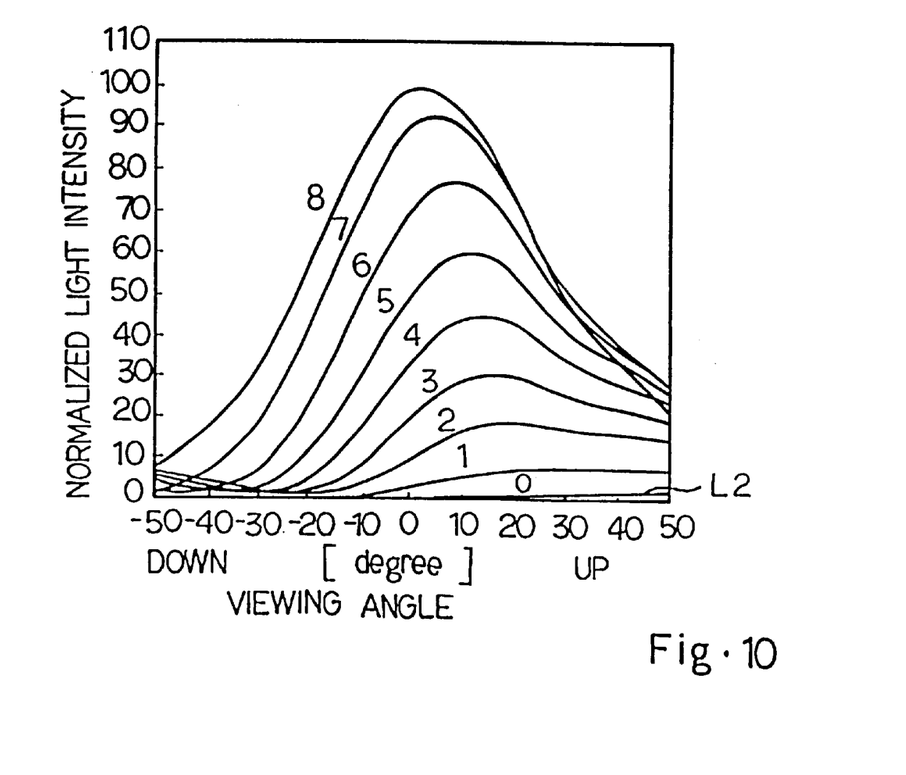
FIG. 10 is a graph showing the gradation achieved by a first comparative sample fabricated without an optically diffusing layer.
Figure 11:
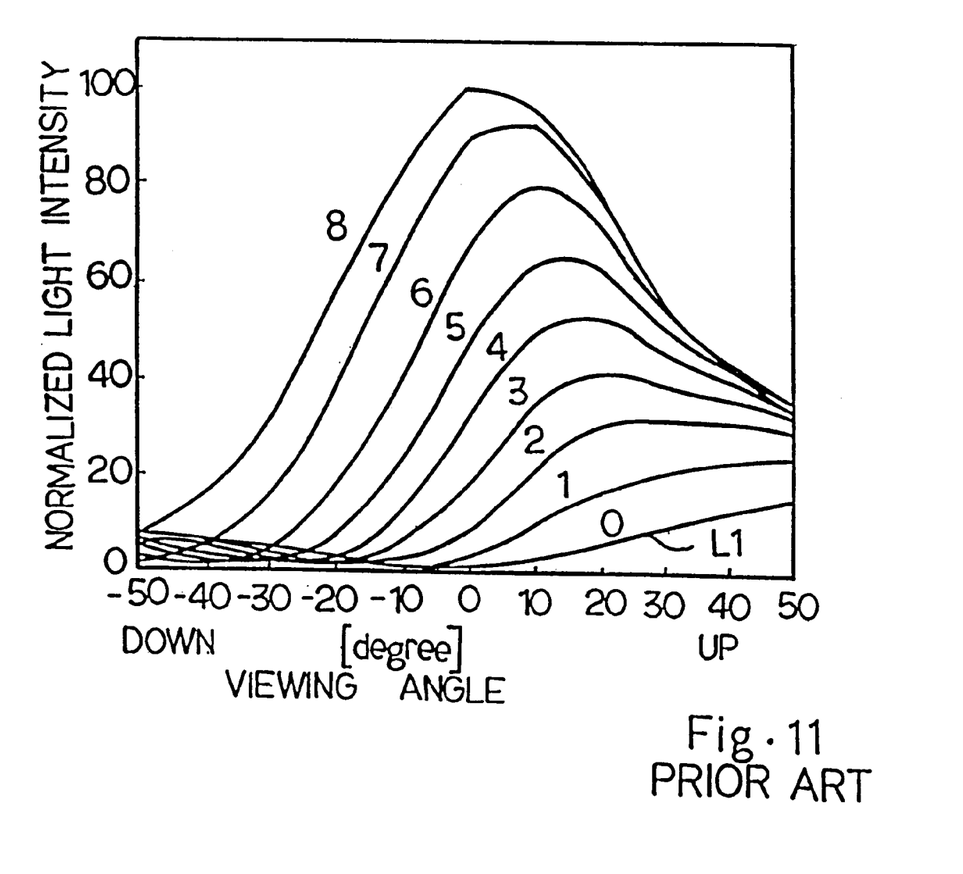
FIG. 11 is a graph showing the gradation achieved by a second comparative sample fabricated without both of the optically diffusing layer and the optical compensating layer.

The present inventor evaluated the liquid crystal display unit shown in FIG. 6 in comparison with a liquid crystal display unit without the optically compensating layer 44. The present inventor fabricated a sample of the liquid crystal display unit shown in FIG. 6 a first comparative sample fabricated without the optically diffusing layer 45 and a second comparative sample fabricated without both of the optically compensating layer 44 and the diffusing layer 45. The present inventor measured the light intensity in terms of the viewing angle changed in the up-and-down direction for the three samples, and topographically plotted the light intensity in terms of the viewing angle as shown in FIGS. 9, 10 and 11. The light intensity was normalized, and numerals "0", "1", "2", "3", "4", "5", "6", "7" and "8" were indicative of the gradation levels.

Comparing FIG. 11 with FIGS. 9 and 10, the lowest contour line L1 representative of an black image on the second comparative sample was merely flat between −5 degrees and +5 degrees, and the light intensity of the black image was increased from ±5 degrees. However, the contour line L2 also representative of an black image on the first comparative sample was flat rather than the contour line L1, and the contrast ratio was enhanced in the first comparative sample. For example, the second comparative sample achieved the viewing angle at the contrast ratio of "10" only between 26.0 degrees in the upward direction and 37.6 degrees in the downward direction. On the other hand, the first comparative sample achieved the viewing angle at the contrast ratio of "10" between 53.0 degrees in the upward direction and 45.3 degrees in the downward direction. Thus, the first comparative sample had the viewing angle at the contrast ratio of "10" almost twice as wide as the viewing angle at the contrast ratio of "10" achieved by the second comparative sample. The difference between the first comparative sample and the second comparative sample was the optically compensating layer 44. Then, the present inventor confirmed that the optically compensating layer 44 was effective against the bright black image.

However, the contour lines representative of the intermediate gradation levels crossed with one another around −15 degrees, and the inversion of gradation still took place in a gray image on the first comparative sample. However, the corresponding contour lines for the sample shown in FIG. 6 did not cross with one another, and the viewing angle at the contrast ratio of "10" was widened to ±70 degrees and more. Thus, the present inventor confirmed that the combination of the optically compensating layer 44 and the optically diffusing layer 45 surely improved the viewing angle and effectively prevented images from the inversion of gradation.

As described hereinbefore in connection with the third prior art liquid crystal panel, the optical diffusion plate 33 of the third prior art widely lowered the contrast ratio of the image seen from the position in front of the image forming screen. However, the optically diffusing layer 45 did not decrease the contrast ratio seen at the front position, because the optically compensating layer had already suppressed the brightness of the black image. In fact, the second comparative sample achieved the front contrast of 230.6, and the sample according to the present invention achieved the front contrast of 161.6.

If light incident from the outside deteriorates the visibility, an anti-reflecting means is effective against the light incident from the outside. A rough surface, a multi-layered coating structure and light-absorbing black matrix are examples of the anti-reflecting means.

The evaluation was summarized in the following table.

TABLE

| Sample | Structure | Front contrast | Viewing angle at 10 Up | Viewing angle at 10 Down | Inv. of gradation |
|---|---|---|---|---|---|
| 2 | If prior art structure | 230.6 | 26.0 | 37.6 | 5° |
| 1 | Opt. compensator | 265.3 | 53.0 | 45.3 | 15° |
| 0 | Opt. compensator + Diffuser | 161.6 | >70 | >70 | No |

As will be appreciated from the foregoing description, the liquid crystal display unit according to the present invention achieves a wide viewing angle without a bright black image and an inversion of gradation over all the gradation levels by virtue of the combination of the optically compensating layer 44 and without the optically diffusing layer 45.

Second Embodiment

Figure 13:
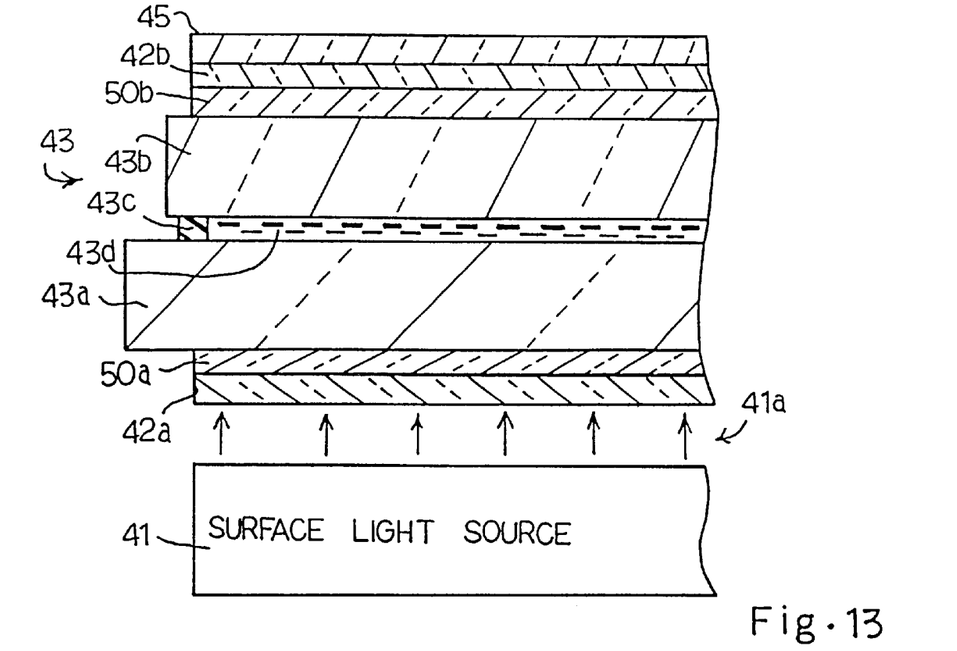
FIG. 13 is a cross sectional view showing the structure of another liquid crystal display unit according to the present invention.

FIG. 13 illustrates the structure of a part of a liquid crystal display unit embodying the present FIG. 13 illustrates the structure of a part of a liquid crystal display unit embodying the present invention. The liquid crystal display unit implementing the second embodiment is similar to the first embodiment except for two optically compensating sub-layers 50a and 50b. For this reason, the other layers are labeled with the same references as those of the corresponding layers of the first embodiment without detailed description.

The optically compensating sub-layer 50a is inserted between the polarizing layer 42a and the active matrix substrate structure 43a, and the other optically compensating sub-layer 50b is inserted between the color filter substrate structure 43b and the polarizing layer 42b. The optically compensating sub-layers 50a and 50b have index ellipsoids differently oriented, and are corresponding to the multi-layered structure shown in FIG. 8C. The dispersion shown in FIG. 8C is easily achieved by separating the optically compensating layer into a plurality of optically compensating sub-layers. When sharing force is differently regulated between the front and reverse surfaces of a film, the optical ellipsoids are differently oriented.

The liquid crystal display unit shown in FIG. 13 achieves all the advantages of the first embodiment, and the appropriate dispersion of index ellipsoid is easily achieved rather than the first embodiment by the optically compensating sub-layers 50A and 50B.

Third Embodiment

Figure 14:
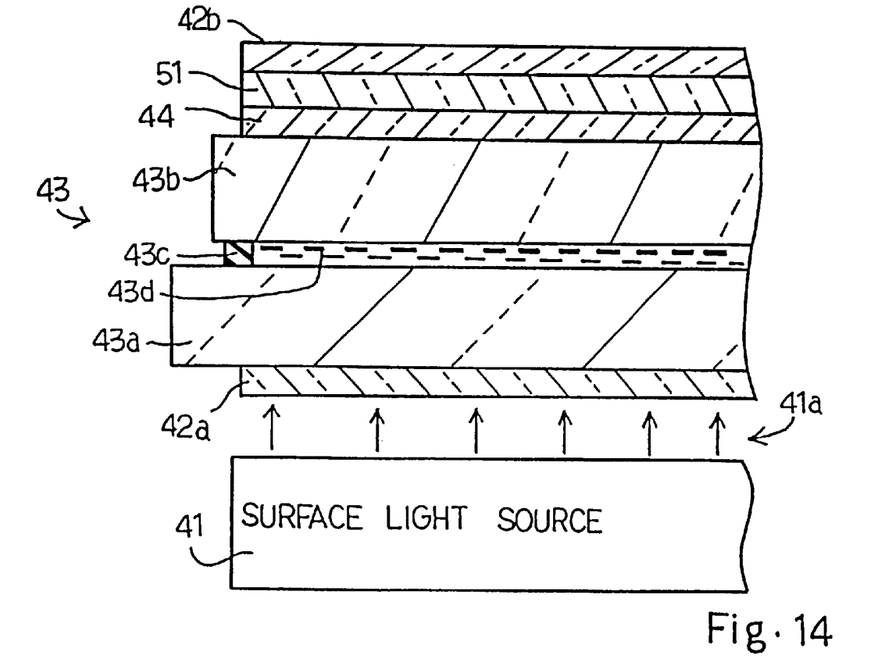
FIG. 14 is a cross sectional view showing the structure of yet another liquid crystal display unit according to the present invention.

FIG. 14 illustrates yet another liquid crystal display unit embodying the present invention. The liquid crystal display unit implementing the third embodiment is similar to the first embodiment except for an optically diffusing layer 51. For this reason, the other layers of the third embodiment are labeled with the references designating corresponding layers of the first embodiment without detailed description.

The optically diffusing layer 44 is inserted between the optically compensating layer 44 and the polarizing layer 42b, and is formed of optical material where the double refraction is negligible. Lenticular cured with ultra-violet light is an example of such an optical material.

When the image carrying light passes the optically compensating layer 44, the image carrying light is linearly polarized. However, if the double refraction takes place in an optically diffusing layer, the image carrying light is elliptically polarized, and the elliptically polarized image carrying light lowers the contrast of the image. The double refraction is negligible in the optically diffusing layer 51, and the optically diffusing layer 51 is covered with the polarizing layer 42b. For this reason, the liquid crystal display unit is prevented from whitening due to irregular/regular reflection on the optically diffusing layer 51.

Thus, the liquid crystal display unit implementing the third embodiment achieves the suppression of light from the outside together with all the advantages of the first embodiment.

Fourth Embodiment

Figure 15:
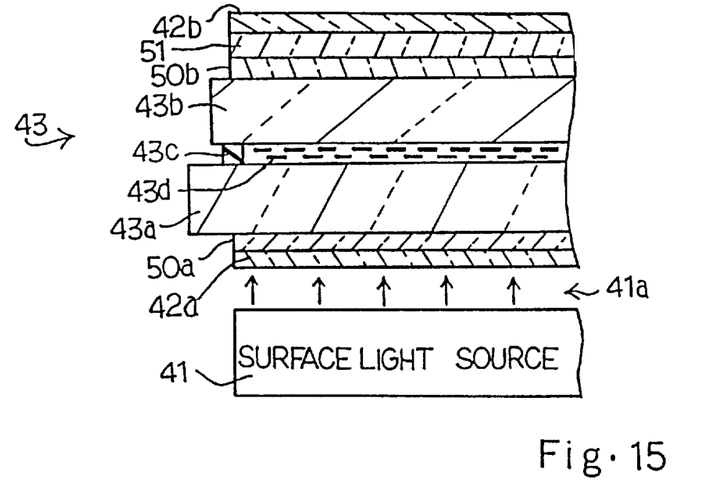
FIG. 15 is a cross sectional view showing the structure of still another liquid crystal display unit according to the present invention.

FIG. 15 illustrates still another liquid crystal display unit embodying the present invention. The fourth embodiment is a compromise between the second embodiment and the third embodiment. For this reason, layers of the fourth embodiment are labeled with the same references designating corresponding layers of the second and third embodiment without detailed description.

The fourth embodiment achieves all the advantages of the second and third embodiments.

Fifth Embodiment

Figure 16:
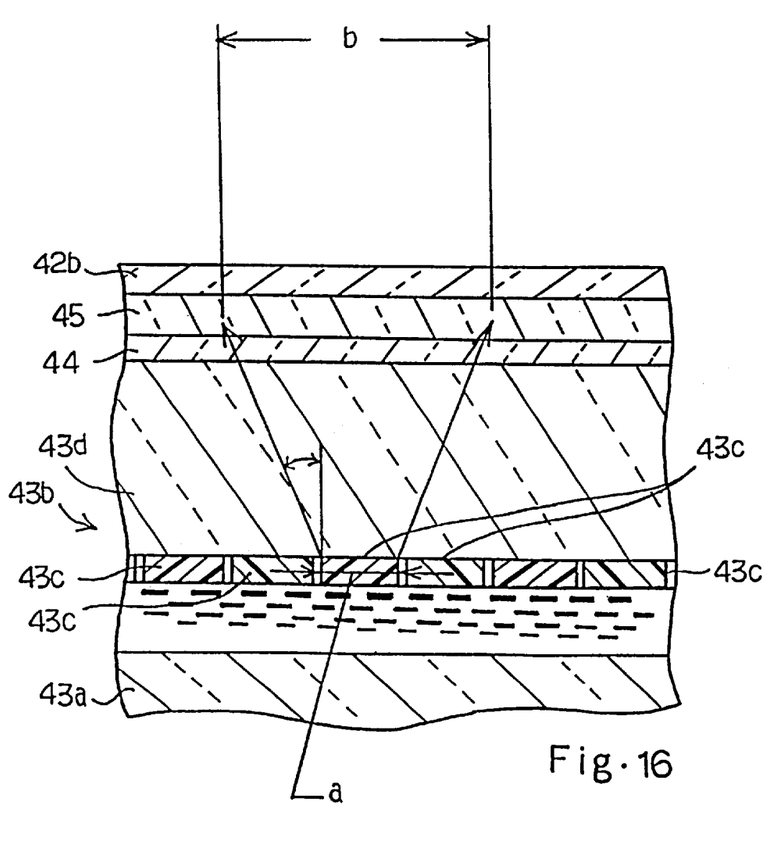
FIG. 16 is a cross sectional view illustrating vagueness of an image due to a thick color filter substrate structure.

When the color filter substrate structure 43b is too thick, the image produced on the screen tends to be vague. The vagueness is derived from the optical diffusion. In detail, FIG. 16 illustrates the structure of a liquid crystal display unit, and layers are labeled with the same references designating corresponding layers of the above described embodiments. The color filter substrate structure 43b has color filter elements 43c for the primary three colors formed on a glass substrate 43d, and the color filter element 43c is assumed to have length of a.

Assuming now that light carrying a piece of image passes through one of the color filter elements 43c, the light is diffused in the glass substrate 43d, and the piece of image is observed in the area of b long. If the length a, the thickness of the glass substrate 43d and angle c are 300 microns, 1 millimeter and 30 degrees, the length b is 300 microns without an optically diffusing layer 45. However, the piece of image passing through the optically diffusing layer 45 is calculated to be 1455 microns long by using the trigonometric function. The optically diffusing layer magnifies the piece of image 4.8 times larger than that produced without it, and a person feels the piece of image vague.

Figure 17:
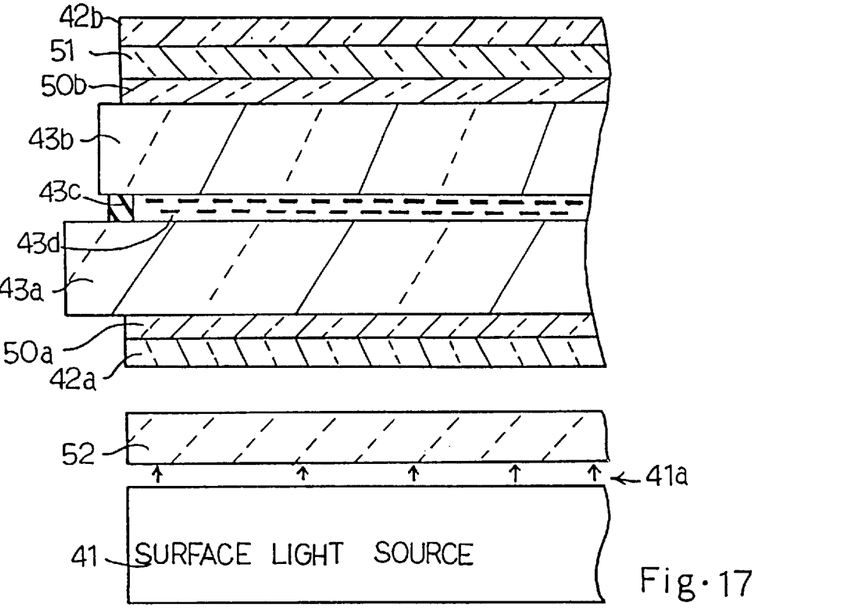
FIG. 17 is a cross sectional view showing the structure of another liquid crystal display unit according to the present invention.

A liquid crystal display unit implementing the fifth embodiment aims at elimination of the vagueness. FIG. 17 illustrates the structure of the liquid crystal display unit implementing the fifth embodiment. The fifth embodiment is fabricated on the basis of the fourth embodiment, and the references used for the fourth embodiment respectively designate corresponding layers of the fifth embodiment.

A condenser layer 52 is provided between the surface light source 41 and the polarizing layer 42a, and the surface light source 41 radiates the light through the condenser layer 52 to the polarizing layer 42a. The condenser layer 52 makes the light 41a close to parallel light. The condenser layer 52 is implemented by a prism lens film or a louver.

The condenser layer 52 may be integral with the surface light source 41. For example, a prism lens may be formed on the surface of the optical guide layer facing to the polarizing layer 42a. Otherwise, a groove pattern may be formed on the surface of the optical guide layer attached to the cold cathode type fluorescent lamp. The prism lens and the groove pattern are formed by using a molding dies, and a corresponding prism lens pattern and a corresponding groove pattern are previously formed in the molding dies.

The light passing through the condenser layer 52 makes the angle c small, and suppresses the diffusion. As a result, the piece of image is prevented from the vagueness.

Sixth Embodiment

Figure 18:
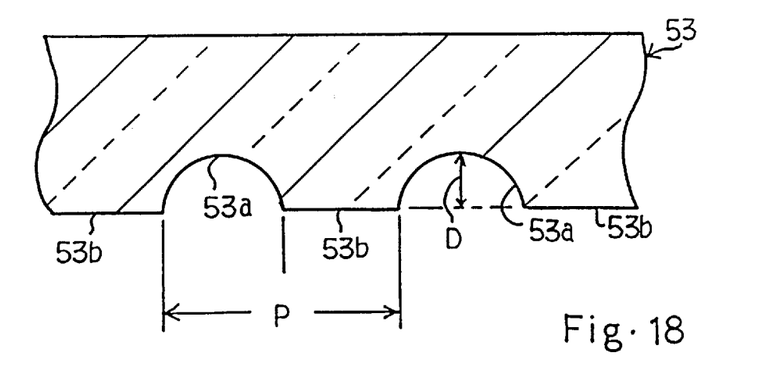
FIG. 18 is a cross sectional view showing an optically diffusing layer incorporated in yet another liquid crystal display unit according to the present invention.

A liquid crystal display unit implementing the sixth embodiment is similar to one of the first to fifth embodiments except. for an optically diffusing layer 53. For this reason, description is focused on the optically diffusing layer 53 of the sixth embodiment. FIG. 18 illustrates the optically diffusing layer 53, and cylindrical concave lenses 53a extend in parallel to one another in a direction perpendicular to the direction where the viewing angle dependency is large. When the optically diffusing layer 53 is incorporated in the liquid crystal display unit having the gradation characteristics shown in FIG. 9, the viewing angle dependency is large in the up-and-down direction, and the cylindrical concave lenses 53a extend in the lateral direction of the screen.

The ratio between depth D and pitch P, i.e., D:P ranges from 2.9:1 to 0.8:10. The desirable range of D:P is between 1.8:10 and 1.2:10. When the ratio falls within the range, both of the visibility and the viewing angle are optimized. The pitch P ranges from 30 microns to 360 microns. The pitch P is not corresponding to the pixels, and is optimized in such a manner as not to produce Moire.

The optically diffusing layer 53 has flat surfaces 53b between the cylindrical concave lenses 53a, and the flat surfaces are finished to be a mirror finish. For this reason, the light is hardly scattered nor refracted in the flat surfaces 53b. This feature is effective against the vagueness. The flat surfaces 53b decreases the diffusion of light; however, the cylindrical concave lenses 53a have a large radius of curvature, and the large radius of curvature compensates the decrement of the diffusion. The diffusion characteristics are regulable by changing the ratio between the area occupied by the cylindrical concave lens 53a and the flat surface 53b and the radius of curvature.

Figure 19:
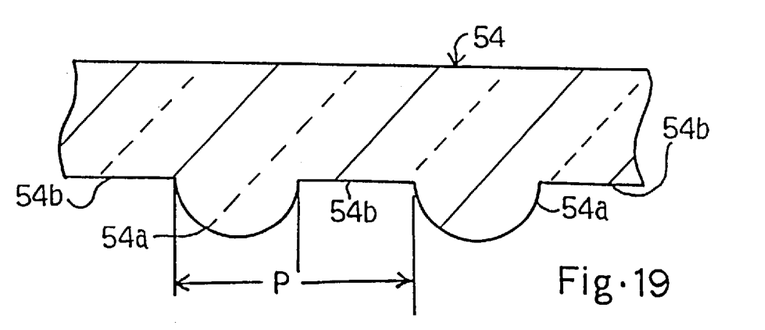
FIG. 19 is a cross sectional view showing another optically diffusing layer equivalent to the optically diffusing layer shown in FIG. 18.

FIG. 19 illustrates another optically diffusing layer 54 equivalent to the optically diffusing layer 53. The optically diffusing layer 54 has cylindrical convex lenses 54a extending in parallel to one another, and the diffusing characteristics are also regulable by changing the ratio between the area occupied by the cylindrical convex lens 54a and the flat surface 54b and the radius of curvature of the convex lenses 54a.

The optically diffusing layers 53 and 54 are formed as follows. First, a polarizing plate is prepared, and the polarizing plate is coated with denaturated acrylate such as hydroxyalkylmethacrylate or alkylmethacrylate. A suitable die is pressed against the denaturated acrylate layer, and ultra-violet light is radiated through the polarizing layer so as to cure the denaturated acrylate layer.

The sixth embodiment achieves all the advantages of the first embodiment.

Although particular embodiments of the present invention have been shown and described, it will be obvious to those skilled in the art that various changes and modifications may be made without departing from the spirit and scope of the present invention.

For example, the present invention is not limited to an active matrix type, and is applicable to any kind of liquid crystal display panel.

The condenser layer 52 may be incorporated in the first, second and third embodiments.

What is claimed is:

1. A liquid crystal display unit comprising:
   a light source generating first light proceeding along an optical path;
   polarizing layers provided on said optical path, and spaced from each other;
   a liquid crystal panel provided between said polarizing layers, and including a liquid crystal layer for producing second light carrying an image from said first light and having a first anisotropic index ellipsoid with respect to one of a normal line to an incident surface of said liquid crystal panel and an oblique line declining from said normal line;
   an optically anisotropic layer provided on said optical path, and having a second anisotropic index ellipsoid opposite to said first anisotropic index ellipsoid with respect to said one of said normal line and said oblique line; and
   an optically diffusing layer provided on said optical path for averaging an intensity of said second light, said second light being produced by said liquid crystal panel;
   in which said optically diffusing layer is inserted between said optically anisotropic layer and one of said polarizing layers provided on the opposite side of said light source with respect to said liquid crystal panel, and said optically diffusing layer is formed of an optical material where a double refraction is negligible.

2. The liquid crystal display unit as set forth in claim 1, in which said optdical material is lenticular cured with ultra-violet light.

* * * * *